(12) United States Patent
Galperin et al.

(10) Patent No.: US 7,037,871 B1
(45) Date of Patent: May 2, 2006

(54) LOW-TEMPERATURE REGENERATION OF ZEOLITE L USING OZONE

(75) Inventors: Leonid B. Galperin, Wilmette, IL (US); Laurence O. Stine, Western Springs, IL (US); Margaret A. Stine, Mount Prospect, IL (US); Timur V. Voskoboinikov, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/990,252

(22) Filed: Nov. 21, 2001

(51) Int. Cl.
*B01J 20/34* (2006.01)
*B01J 38/00* (2006.01)

(52) U.S. Cl. .............................. 502/38; 502/52; 502/34
(58) Field of Classification Search ................ 502/52, 502/38, 34, 53; 208/134, 138, 140
See application file for complete search history.

(56) References Cited

U.S. PATENT DOCUMENTS

| | | | |
|---|---|---|---|
| 2,684,927 A | 7/1954 | Bergstrom | 196/52 |
| 2,868,721 A | 1/1959 | Bergstrom | 208/174 |
| 4,133,743 A | 1/1979 | Boret et al. | 203/64 |
| 4,218,338 A | 8/1980 | Huin et al. | 252/415 |
| 4,507,397 A | 3/1985 | Buss | 502/38 |
| 4,810,683 A | 3/1989 | Cohn et al. | 502/37 |
| 5,155,075 A | 10/1992 | Innes et al. | 502/52 |
| 5,183,789 A | 2/1993 | Boyle | 502/52 |
| 5,330,736 A * | 7/1994 | Wu et al. | 423/709 |
| 5,365,009 A | 11/1994 | Uppal et al. | 585/722 |
| 5,756,414 A * | 5/1998 | Huang et al. | 502/37 |
| 5,883,031 A | 3/1999 | Innes et al. | 502/38 |
| 6,040,259 A * | 3/2000 | Mohr et al. | 502/67 |

FOREIGN PATENT DOCUMENTS

| | | |
|---|---|---|
| DE | 4436656 A1 * | 4/1996 |
| JP | 03224633 A * | 10/1991 |

OTHER PUBLICATIONS

C. L. Pieck et al., "Influence of O2 and O3 regeneration on the metallic phase of the Pt-Re/Al2O3 catalyst", Applied Catalysis A: General 165 (1997) 207-218.*

Carlos A. Querini, "Isobutane/butane alkylation: regeneration of solid acid catalysts", Catalysis Today 62 (2000) 135-143.*

Copperthwaite, R.G. et al. Regeneration of Pentasil Zeolite Catalysts Using Ozone and Oxygen *J. Chem. Soc.*, Faraday Trans. 1, 1986, 82, pp. 1007-1017.

Pieck, C.L. et al. Regeneration of Coked Pt-Re/Al$_2$O$_3$ Catalyst by Burning with Oxygen and Ozone *Catalyst Deactivation 1994, Studies in Surface Science and Catalysis*, vol. 88 pp. 289-295 1994 Elsevier Science B.V., The Netherlands ISBN-0-444-81682-8.

Querini, C.A. et al Isobutane Alkylation with C$_4$ Olefins: Low Temperature Regeneration of Solid Acid Catalysts with Ozone *Catalyst Deactivation 1997, Proceedings of the 7$^{th}$ International Symposium, Cancun, Mexico*, Oct. 5-8, 1997 *Studies in Surface Science and Catalyst*, vol. 111, pp. 407-414 1997 Elsevier Science B.V.

Pieck, C.L. et al. Differential Effect of Coke Burning with Oxygen or Ozone on Pt-Re Interaction on Pt-Re/Al$_2$O$_3$*Catalyst Deactivation 1997, Proceedings of the 7$^{th}$ International Symposium, Cancun, Mexico*, Oct. 5-8, 1997 *Studies in Surface Science and Catalysis*, vol. 111 pp. 433-438 1997 Elsevier Science B.V.

* cited by examiner

*Primary Examiner*—Walter D. Griffin
(74) *Attorney, Agent, or Firm*—John G. Tolomei; Michael A. Moore

(57) ABSTRACT

A process is disclosed for regenerating a hydrocarbon conversion catalyst comprising zeolite L with ozone. The catalyst is contacted with ozone at a temperature of from about 20 to about 250° C. and a concentration of ozone of from about 0.1 to about 5 mol-%. The catalyst may contain coke. The process at least partially restores the activity of the catalyst. The process is particularly useful for reforming and dehydrocyclodimerization catalysts.

6 Claims, 1 Drawing Sheet

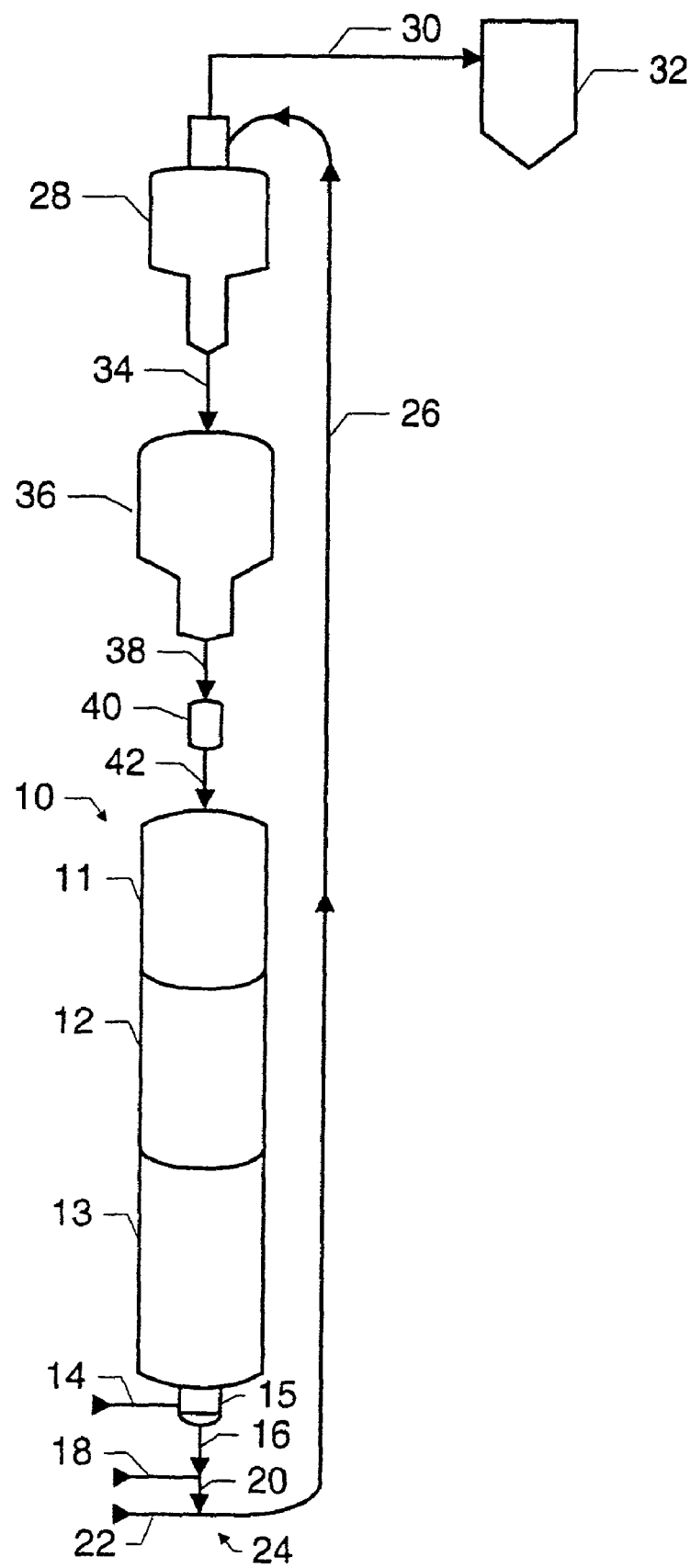

LOW-TEMPERATURE REGENERATION OF ZEOLITE L USING OZONE

FIELD OF THE INVENTION

This invention relates to regeneration of a hydrocarbon conversion catalyst.

BACKGROUND OF THE INVENTION

Catalyst composites containing zeolites are well known and are commonly used to convert hydrocarbons. The use of zeolite L in combination with other catalytic components is known to be an effective catalyst for reforming hydrocarbons. Reforming converts $C_6$ and $C_7$ light paraffinic hydrocarbons into $C_6$-plus aromatic hydrocarbons, such as benzene and toluene. The $C_6$-plus aromatic hydrocarbons are valuable as high-octane gasoline blending components and as intermediates in the production of commodity petrochemicals.

In reforming, a paraffinic hydrocarbon feedstock contacts a zeolite L-containing catalyst in the presence of hydrogen at an elevated temperature. Paraffins in the feedstock react to form the desired aromatic hydrocarbon product, of course. But other reactions form coke, an undesired carbonaceous byproduct that accumulates in deposits on the catalyst and deactivates the catalyst. Well known steps to regenerate deactivated zeolite L-containing catalyst remove these coke deposits by contacting the coked catalyst with a gas containing molecular oxygen at an elevated temperature (typically above 450° C. (842° F.)) to burn the coke. However, it is also well known that such coke burning significantly worsens the activity, conversion, and selectivity of the zeolite L-containing catalyst, because it agglomerates one of the other components on the catalyst, which is typically an IUPAC Group 8–10 (VIII A) metal. As a result, additional subsequent steps must be added to the regeneration process to redisperse the catalytic metal. These redispersion steps are well known and usually involve contacting the catalyst with a halogen-containing gas, often in the presence of molecular oxygen and water vapor.

Eliminating the redispersion step is desirable for several reasons. First, the presence during redispersion of molecular halogen, such as chlorine, and/or its compounds, such as hydrogen chloride, with water can corrode or otherwise damage equipment used in regeneration. Second, the halogen-containing materials present during redispersion are volatile and the environmental risk arising from their accidental release to the atmosphere is more and more undesirable. Third, prolonged exposure of the catalyst to the elevated temperatures used in redispersion can damage certain select physical properties, such as the surface area, of the catalyst. Fourth, redispersion is time-consuming and inefficient, since it would be a better use of the capital investment in the catalyst if the catalyst were being used to reform hydrocarbons rather than undergoing redispersion, provided that the catalytic metal remains dispersed.

Using ozone at low temperature to regenerate zeolite catalysts has had unpredictable results. Failure or only partial success occurred when the catalyst lacked a metal, as described in U.S. Pat. No. 5,183,789 at col. 2, lines 37–57. Since metals catalyze the conversion of ozone to oxygen, the prior art expected that adding a metal to a catalyst would worsen the chances for a successful regeneration. That in fact happened with a paraffin conversion catalyst as described in the article by C. R. Vera, et al., in Catalyst Deactivation 1999, Studies in Surface Science and Catalysis, vol. 126, at pages 381–388. But in contrast in U.S. Pat. No. 5,183,789, a reforming catalyst containing a metal was successfully regenerated; see col. 2, line 57 to col. 3, line 41, and col. 4, lines 32–38.

A method for regeneration of a zeolite L containing catalyst is sought which eliminates the need for redispersion.

SUMMARY OF THE INVENTION

This invention is a method of regenerating a hydrocarbon conversion catalyst comprising zeolite L by contacting the catalyst with ozone, preferably at relatively low temperatures. Preferably, the contacting occurs with ozone concentration of from about 0.1 to about 5 mol-%, at a partial pressure of ozone of up to about 101.3 kpa(g) (1 atmosphere (g)), and at a temperature of from about 20 to about 250° C. (68 to 482° F.).

One object of this invention is to improve processes for regeneration of hydrocarbon conversion catalysts. Another object is to minimize corrosion of equipment while regenerating hydrocarbon conversion catalysts. A third object is to minimize the environmental risk of accidental releases of volatile substances during regeneration. A fourth object is to minimize regeneration-induced damage to certain physical properties of the catalyst, such as surface area. A fifth object is to provide a regeneration method for a zeolite L containing catalyst that does not require redispersion. A sixth object is to provide a hydrocarbon conversion process using at least intermittent catalyst regeneration having one or more of the aforementioned five objects.

INFORMATION DISCLOSURE

U.S. Pat. No. 2,684,927 (Bergstrom) and U.S. Pat. No. 2,868,721 (Bergstrom) describe a hydrocarbon conversion process that uses gravity flow of particles from a converter to a reconditioner or kiln or regenerator.

U.S. Pat. No. 4,133,743 (Boret et al.) and U.S. Pat. No. 4,218,338 (Huin et al.) describe hydrocarbon conversion processes that use gravity flow of particles from a regeneration zone to a catalyst zone.

U.S. Pat. No. 4,507,397 (Buss) describes regenerating reforming catalyst comprising type L zeolite using an oxygen-containing gas.

U.S. Pat. No. 4,810,683 (Cohn et al.) describes regenerating catalyst, which is deactivated by carbonaceous material deposits and which comprises a nonacidic zeolite such as zeolite L and a Group VIII metal, using a gas stream comprising oxygen, a halogen or a halogen-containing compound, and an inert component.

U.S. Pat. No. 5,155,075 (Innes et al.) and U.S. Pat. No. 5,833,031 (Innes et al.) describe a regeneration process for coke containing catalyst comprising platinum on a zeolite L molecular sieve comprising contacting the catalyst with a halogen-free oxygen-containing gas.

U.S. Pat. No. 5,183,789 (Boyle) describes regenerating coked platinum-alumina, or polymetallic-platinum alumina reforming catalyst using a gaseous stream of ozone in air. See also the article by C. L. Pieck et al., in Catalyst Deactivation 1994, Studies in Surface Science and Catalysis, vol. 88, at pages 289–295, which describes regenerating coked platinum-rhenium/alumina catalysts by burning with oxygen and ozone, and then using the regenerated catalyst to hydrogenate benzene to produce cyclohexane and to isomerize n-pentane to produce iso-pentane. See also the article by C. L. Pieck et al., in Catalyst Deactivation 1997, Studies in Surface Science and Catalysis, vol. 111, pages 433–438, which describes regenerating coked platinum-rhenium/alumina catalysts by burning with oxygen or ozone, and then using the regenerated catalyst in the hydrogenolysis of cyclopentane.

U.S. Pat. No. 5,365,009 (Uppal et al.) describes regenerating a zeolite Y alkylation catalyst having carbonaceous material in the presence of ozone. See also the article by C. A. Querini et al., in Catalyst Deactivation 1997, Studies in Surface Science and Catalysis, vol. 111, pages 407–414.

The article by Copperthwaite et al., J. Chem. Soc., Faraday Trans. 1, 1986, 82, pages 1007–1017 describes regenerating pentasil zeolite catalyst using ozone and oxygen and then using the regenerated catalyst to convert methanol to hydrocarbons or to isomerize o-xylene.

BRIEF DESCRIPTION OF THE DRAWING

The FIGURE shows a flow diagram of an embodiment of the invention.

DETAILED DESCRIPTION OF THE INVENTION

This invention is a regeneration method for a catalyst comprising zeolite L, which results in a regenerated catalyst preferably having activity, conversion, and selectivity similar to those of fresh catalyst.

An essential feature of the catalyst used in this invention is that it comprises zeolite L. A typical composition of L-type zeolite, expressed in terms of mole ratios of oxides, may be represented as follows:

$$(0.9–1.3)M_{2/n}O:Al_2O_3:(5.2–6.9)SiO_2:yH_2O$$

wherein M designates a cation, n represents the valence of M, and y may be any value from 0 to 9. Zeolite L, its X-ray diffraction pattern, its properties, and method for its preparation are described in detail in U.S. Pat. No. 3,216,789, which is hereby incorporated herein by reference. The true formula may vary without changing the crystalline structure. For example, the mole ratio of silicon to aluminum (Si/Al) may vary over a range that is typically 1.5 to 3.5, but may be higher. Zeolite L is a type material of the LTL zeolite structure type and is described at pages 132–133 in "Atlas of Zeolite Structure Types," by W. M. Meier, et al., published on behalf of the Structure Commission of the International Zeolite Association by Elsevier, Boston, Mass., USA, Fourth Revised Edition, 1996. The teachings of the "Atlas of Zeolite Structure Types," Fourth Revised Edition, respecting the LTL zeolite structure type and zeolite L are hereby incorporated herein by reference.

Preferably, the zeolite L is a nonacidic zeolite. By "nonacidic zeolite," it is meant that the zeolite L has substantially all of its cationic sites of exchange occupied by nonhydrogen cationic species. Preferably, such cationic species will comprise one or more of the alkali metal cations, including lithium, sodium, potassium, rubidium, and cesium. An especially preferred nonacidic zeolite L for use in this invention is the potassium form of zeolite L. It should also be understood, however, that the nonacidic zeolite L used in the invention may contain more than one type of the alkali metal cation at the cationic exchangeable sites, for example, sodium and potassium. In addition, other cationic species may be present, such as alkaline earth cations including calcium, magnesium, strontium, and barium. Irrespective of the actual cationic species present in the sites of exchange, the zeolite L used in this invention has substantially all of the cationic sites occupied by nonhydrogen cations, thereby rendering the zeolite L substantially fully cationic exchanged. Many means are well known in the art for arriving at a substantially fully cationic exchanged zeolite L and thus they need not be elaborated herein.

The catalytic composite used in the present invention may comprise a mixture of zeolite L and one or more different zeolites. Of course, each of the zeolites employed in the catalyst is preferably a nonacidic zeolite, as defined above and, therefore, the cationic exchangeable sites are substantially fully cationic exchanged with nonhydrogen cationic species.

Although the zeolite L-containing catalyst useful in this invention may be used without a support matrix or binder, it is preferably bound with a support matrix or binder. The support matrix may comprise any support matrix typically utilized to bind zeolitic-containing catalytic composites. Such support matrices are well known in the art and include clays, bauxite, refractory inorganic oxides such as alumina, zirconium dioxide, hafnium oxide, beryllium oxide, vanadium oxide, cesium oxide, chromium oxide, zinc oxide, magnesia, thoria, boria, silica-magnesia, chromia-alumina, alumina-boria, etc. A preferred support matrix comprises silica, and an especially preferred support matrix comprises alumina. It is further preferred that the support matrix be substantially inert to the reactants to be converted by the composite as well as the other constituents of the composite. To this end, it is preferred that the support matrix be nonacidic to avoid promotion of undesirable side-reactions. Such nonacidity may be induced by the presence of alkali metals.

The zeolite L may be bound with the support matrix by any method known in the art. Such binding methods include pilling, extruding, granulating, marumerizing, etc. Particularly preferred methods include the so-called oil-drop method and extrusion. Typically, in binding a zeolite in a support matrix by means of the oil-drop method, powdered zeolite is admixed with a sol comprising the desired support matrix or precursors thereof, and a gelling agent. Droplets of the resulting admixture are dispersed as spherical droplets in a suspending medium, typically oil. The gelling agent thereafter begins to cause gelation of the sol as a result of the change in the sol pH. The resulting gelled support matrix has bound therein the zeolite. The suspending medium helps maintain the spherical shape of the droplets. Usable suspending mediums include Nujol, kerosene, selected fractions of gas oil, etc. Many gelling agents are known in the art and include both acids and bases. Hexamethylenetetramine is only one such known gelling agent. The hexamethylenetetramine slowly decomposes to ammonia upon heating. This results in a gradual pH change and as a result a gradual gelation.

Extrusion is another catalyst formulation method useful in the preparation of a catalyst that can be used in this invention. In general, the extrusion method of preparing a catalyst composite comprises combining a powdered form of the desired zeolite with a powdered support matrix such as one selected from the group mentioned above. The powders are combined with a liquid peptizing agent to transform the powder into a dough. The choice of peptizing agent will vary depending upon the support matrix chosen. The peptizing agent can be an acid such as nitric acid, acetic acid, citric acid, or the like. The peptizing agent may also be a base such as a hydroxide or ammonia.

The dough produced by adding the peptizing agent is then extruded through an appropriately sized die plate to produce cylindrical particles. The extrudate is then dried and calcined at conditions known in the art, typically followed by deposition of catalytic components, such as a metal component, upon the catalyst by means known in the art.

Regardless of the exact method of binding the nonacidic zeolite in the support matrix, sufficient zeolite L may be used to result in a catalytic composite comprising from about 1 to about 100 wt-% zeolite L based on the weight of zeolite and any support matrix. The exact amount of zeolite L advantageously included in the catalytic composite of the invention will be a function of any other specific zeolites, the support matrix, and the specific application of the catalytic composite. A catalytic composite comprising about 50 to 75 wt-% potassium form of zeolite L bound in alumina is preferred.

Another preferred feature of the catalyst used in this invention is the presence of catalytically effective amounts of an IUPAC Group 8–10 (VIII A) metal component, including catalytically effective amounts of nickel, ruthenium, rhodium, osmium, palladium, iridium, platinum, or mixtures thereof. Especially preferred among the Group 8–10 metal components is platinum. The Group 8–10 metal component may be composited with the other constituents of the catalytic composite by any suitable means known in the art. For example, a platinum component may be impregnated by means of an appropriate solution such as a dilute chloroplatinic acid solution. Alternatively, the Group 8–10 metal component may be composited by means of ion exchange, in which case some of the cationic exchange sites of the zeolite L may contain Group 8–10 metal cations. After ion exchange, the Group 8–10 metal may be subject to a low temperature oxidation using ozone according to the method of this invention and prior to any reduction step. The Group 8–10 metal component may be composited with the other constituents either prior or subsequent to the deposition of the hereinafter-described optional surface-deposited alkali metal. Additionally, the Group 8–10 metal may be composited with the zeolite L and thereafter the zeolite-L-containing Group 8–10 metal may be bound with the support matrix.

In addition to comprising a Group 8–10 metal component, it is contemplated that the catalyst used in the present invention may contain other metal components well known to have catalyst-modifying properties. Such metal components include members of IUPAC Group 6 (VI A), IUPAC Group 7 (VII A), IUPAC Group 12 (II B), IUPAC Group 13 (III B), IUPAC Group 14 (IV B), the lanthanides, and the actinides. Such metal components include components of rhenium, tin, cobalt, indium, gallium, lead, zinc, uranium, thallium, dysprosium, and germanium, etc. Incorporation of such metal components has proven beneficial in catalytic reforming as promoters and/or extenders. Accordingly, catalytically effective amounts of such modifiers may be beneficially incorporated into the catalyst used in this invention.

Irrespective of the particular Group 8–10 metal component(s) or catalyst-modifying component(s) composited in the catalyst used in this invention, the catalyst may comprise an optional surface-deposited alkali metal sufficient to provide a surface-deposited alkali metal index of at least 10 and preferably from about 40 to about 500. It is to be understood that by "surface-deposited alkali metal", it is meant that the alkali metal component is not associated with a cationic exchangeable site, but rather is excess alkali metal component above that amount required to occupy substantially all of the cationic exchangeable sites. It is to be further understood that the surface-deposited alkali metal index is indicative of the amount of such surface-deposited alkali metal. As used herein, the term "surface-deposited alkali metal index" is defined as $10^4$ multiplied by the moles per liter of soluble alkali metal yielded by the weight of catalytic composite comprising 0.5 g of nonacidic zeolite placed in 10 cc of deionized water as measured by an electrode sensitive to the alkali metal at 25° C. (77° F.).

Any of the alkali metals may be used as the surface-deposited alkali metal including lithium, sodium, potassium, rubidium, cesium, and mixtures thereof. The surface-deposited alkali metal giving the best results will depend on any other particular zeolite used, if any. Potassium on the potassium form of zeolite L is especially preferred.

The surface-deposited alkali metal may be composited with the catalyst used in this invention by any suitable technique. Standard impregnation technique may be employed utilizing an aqueous solution of an alkali metal salt. Either basic or neutral salts may be used. For example, when surface-depositing potassium on a catalyst comprising the potassium form of zeolite L, the impregnation solution may comprise a basic salt of potassium such as $KHCO_3$, $K_2CO_3$, KOH, etc. Alternatively, a solution comprising neutral potassium salt such as KCl may be used.

As previously indicated, the catalyst regenerated by the method of this invention becomes deactivated at least partially as a result of coke accumulation on the catalyst due to contacting the catalyst with a hydrocarbon at hydrocarbon conversion conditions. The exact amount of coke deposits on the catalyst that causes some catalyst deactivation depends on the particular catalyst and on the reaction catalyzed. Generally, catalyst that is regenerated by the method of this invention contains coke deposits in an amount of generally up to about 30 wt-%, and more commonly up to about 10 wt-%, based on the weight of the catalyst. Coke is comprised primarily of carbon but is also often comprised of a relatively small quantity of hydrogen, generally from 0.5 to 10 wt-% of the coke. The catalyst used in the present invention may become deactivated through use in a wide variety of hydrocarbon conversion conditions. The exact conditions will depend upon the particular charge stock and reaction to be effected. Generally, these conditions include a temperature of from about 260° C. to about 815° C. (500 to 1499° F.), a pressure of from atmospheric pressure up to about 10130 kPa(g) (100 atmosphere(g)), a liquid hourly space velocity (calculated on the basis of equivalent liquid volume of the charge stock contacted with the catalyst per hour divided by the volume of conversion zone containing catalyst) of about 0.2 to 15 $hr^{-1}$. Furthermore, hydrocarbon conversion conditions may include the presence of a diluent such as hydrogen. When such is the case, the hydrogen to hydrocarbon mole ratio may be from about 0.5:1 to about 30:1.

A particularly preferred application of the catalyst used in this invention is its use as a dehydrocyclization catalyst and in particular for the dehydrocyclization of $C_6$–$C_8$ nonaromatic hydrocarbons. Accordingly, a hydrocarbon charge stock comprising $C_6$–$C_8$ nonaromatic hydrocarbons is contacted with the catalyst of the present invention at dehydrocyclization conditions. Dehydrocyclization conditions include a pressure of from about 0 to about 6888 kpa(g) (0 to 68 atmosphere(g)), with the preferred pressure being from about 172 to about 4153 kPa(g) (1.7 to 41.0 atmosphere(g)), a temperature of from about 425° C. to about 650° C. (797 to 1202° F.), and a liquid hourly space velocity of from about 0.1 to about 10 $hr^{-1}$. Preferably, hydrogen may be employed as a diluent. When present, hydrogen may be circulated at a rate of from about 1 to about 10 moles of hydrogen per mole of charge stock hydrocarbon. Further information on dehydrocyclization may be found, for example, in U.S. Pat. No. 4,507,397 and U.S. Pat. No. 4,810,683.

Another particularly preferred application of the catalyst used in this invention is as a reforming catalyst. Catalytic reforming is a well-established hydrocarbon conversion process employed in the petroleum refining industry for improving the octane quality of hydrocarbon feedstocks, the primary product of reforming being motor gasoline or its blending components. The art of catalytic reforming is well known and does not require detailed description herein. Briefly, in catalytic reforming a feedstock is admixed with a recycle stream comprising hydrogen and contacted with catalyst in a catalyst bed. The usual feedstock for catalytic reforming is some or all of a petroleum fraction known as naphtha, which has an initial boiling point of about 80° C. (180° F.) and an end boiling point of about 205° C. (400° F.). The catalytic reforming process is particularly applicable to the treatment of straight run gasolines comprised of relatively large concentrations of naphthenic and substantially straight chain paraffinic hydrocarbons including $C_6$–$C_8$ nonaromatic hydrocarbons, which are subject to aromatization through dehydrogenation and/or cyclization reactions. Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Reforming conditions include the dehydrocyclization conditions described above. Further information on reforming processes may be found in, for example, U.S. Pat. No. 4,119,526 (Peters et al.); U.S. Pat. No. 4,409,095 (Peters); and U.S. Pat. No. 4,440,626 (Winter et al.). See also the book entitled "Handbook of Petroleum Refining Processes," edited by Robert A. Meyers, Second Edition, McGraw-Hill Book Company, New York, 1997, at Part 4 "Catalytic Reforming."

Other applications of the catalyst used in this invention are in paraffin dehydrogenation processes. Further information on these process applications can be found in the previously mentioned book edited by Robert A. Meyers at Chapter 5.1 "UOP Oleflex Process for Light Olefin Production" and at Chapter 5.2 "UOP Pacol Dehydrogenation Process.".

When the catalysts of the type described above are employed in the conversion of hydrocarbons, particularly the reforming process outlined above, the activity, selectivity, and stability of these catalysts are initially quite acceptable. For example, in a reforming process, this type of catalyst has several singular advantages, among which are increased aromatic yield, decreased rate of coke laydown on the catalyst, increased hydrogen make, enhanced stability of both the aromatic yield and temperature necessary to make octane, and excellent catalyst life before regeneration becomes necessary. However, the gradual accumulation of coke and other deactivating carbonaceous deposits on the catalyst will eventually reduce the activity and selectivity of the process to a level such that regeneration is desirable. Ordinarily, regeneration becomes desirable when about 0.5 to about 15 wt-% or more of coke or other carbonaceous deposits have been formed upon the catalyst.

The catalyst must be reconditioned, or regenerated, before it can be reused in a reforming process. Numerous regeneration methods are in use commercially and nearly all involve to some extent the combustion of coke from the surface of the catalyst. The particular method of regeneration that a specific reforming process employs depends on the design of the catalyst bed(s) in the reforming reactor(s). A commercial reforming reactor generally employs one of two different designs of catalyst beds: moving beds and fixed beds.

In a moving bed, deactivated catalyst is withdrawn from the catalyst bed and fresh or regenerated catalyst is added to the bed, while the catalyst bed is in use for converting hydrocarbons. Moving catalyst beds allow catalyst to be continuously moved from the reactor to an adjacent regeneration zone, regenerated, and moved back to the reactor. In many modern reforming catalytic processes, catalyst is moved continuously or semi-continuously through the reactor and/or through a regeneration vessel or a series of regeneration vessels, in which the various steps involved in a regeneration cycle are performed. Due to the well-known difficulties involved in transferring solids from location to location, true continuous movement is difficult to achieve. Some conventional catalytic regeneration processes use continuous movement of catalyst at certain locations within the reactor and/or regeneration vessel(s) and semi-continuous movement at other locations within the reactor and/or regeneration vessel(s). By semi-continuous movement is meant the repeated transfer of a relatively small amount of catalyst at closely spaced points in time. For example, one batch of catalyst may be transferred out of the reactor and/or regeneration vessel(s) each two minutes. If the inventory in the reactor and/or regeneration vessel(s) is sufficiently large, the movement approximates continuous transfer of catalyst. The present invention may use continuous or semi-continuous movement of catalyst.

In contrast, fixed catalyst beds keep the catalyst stationary. When the catalyst in a fixed bed reactor becomes deactivated, the hydrocarbon charge stock into the reactor is stopped and the reactor is purged with a suitable gas stream. With the reactor thus temporarily taken out of service, the catalyst is either regenerated in situ or else unloaded and replaced with regenerated or fresh catalyst. Two types of in situ regeneration methods are used commercially: cyclic regeneration and semi-regeneration. In the cyclic regeneration method, one of the reactors is taken out of service and the reforming process continues in operation with the remaining reactors. After the deactivated catalyst is regenerated, the reactor is placed back in service. In semi-regenerative reforming, the reforming process is temporarily stopped and all of the reactors are taken out of service simultaneously for regeneration. After the catalyst has been regenerated, all the reactors are placed back in service and the reforming process is resumed.

In a preferred embodiment, this invention uses a reaction zone and a regeneration zone containing catalyst beds that are capable of moving but which do not move to any significant extent for extended periods of time. As long as the catalyst in the reaction zone beds remains sufficiently active to catalyze the desired reactions, the reaction zone beds remain stationary. But when the catalyst activity in one or more of the beds falls below a desired level of activity, movement of catalyst is started. Usually, the catalyst that is withdrawn from the reaction zone is the catalyst that is most deactivated.

In this preferred embodiment, once catalyst movement is started, a regenerator-sized batch of deactivated catalyst is withdrawn from the reaction zone, and a batch of fresh or regenerated catalyst of comparable amount is added to the reaction zone. The inventory of catalyst in the reaction zone is thus kept relatively constant. Once begun, catalyst movement into and out of the reaction zone may be continuous or semicontinuous, as described above. If the reactor beds are in a vertical stacked arrangement, withdrawing catalyst from the reactor bed at the bottom of the stack will cause catalyst to move by gravity flow through all of the other reactor beds. If the reactor beds are in a side-by-side arrangement, withdrawing catalyst from one reactor bed will not necessarily cause catalyst to flow through any of the other reactor beds. But, even in a side-by-side arrangement, movement of catalyst through all of the other reactor beds can take place, if withdrawing catalyst from any one reactor initiates withdrawing catalyst from each of the other reactors and transporting that withdrawn catalyst to another reactor. Apparatus and devices for accomplishing such inter-reactor transport of catalyst are known to persons of ordinary skill in the art.

Once the desired amounts of catalyst have been withdrawn from and added to the reaction zone, movement of catalyst in the reaction zone is stopped and the reactor bed(s) again become stationary. In this preferred embodiment, the flow of hydrocarbons through the reaction zone continues normally and the entire reaction zone itself remains in service while catalyst is moving in the reaction zone.

Catalyst that is withdrawn from the reaction zone is usually purged with a suitable gas stream and then transported to the regeneration zone. At that time, the regeneration zone will usually initially be empty of catalyst. Any catalyst that had been previously regenerated in the regeneration zone has usually already been withdrawn from the regeneration zone and stored in a hopper that supplies a reservoir of regenerated catalyst for the reaction zone. If the regeneration zone is not initially empty, previously regenerated catalyst in the regeneration zone can be transported from the regeneration zone at the same time that deactivated catalyst is transported into the regeneration zone. Once the regeneration zone is filled with catalyst to be regenerated, catalyst transport to and, if any, from, the regeneration zone stops. The catalyst in the regeneration zone is maintained in a fixed bed while it undergoes a regeneration process to restore the catalyst to its full reaction promoting ability. When the regeneration process in the regeneration zone is complete, the regeneration zone is purged with a suitable gas stream, and the catalyst is withdrawn from the bottom of the regeneration zone and transported to the previously mentioned hopper of regenerated catalyst or directly back to reactor. Alternatively, the catalyst is withdrawn from the bottom of the regeneration zone and is purged with a suitable gas stream as it is being transported to the reactor. Movement of the catalyst from the regeneration zone is often referred to as continuous though, in practice, it is semicontinuous, as described previously. For more details on processes using batchwise regeneration of catalyst particles in a separate fixed bed regenerator, see U.S. Pat. No. 4,133,743 (Boret et al.) and U.S. Pat. No. 4,218,338 (Huin et al.).

Alternatively, the present invention is applicable to a process with a moving-bed regeneration zone. Regenerated catalyst particles are fed to a reaction zone, which may be comprised of several reactors, and the particles flow through the reactors by gravity. Catalyst is withdrawn from the bottom of the reaction zone and transported to a regeneration zone where it is regenerated. Catalyst flows by gravity through the regeneration zone, which may comprise more than one regeneration step and then is withdrawn from the regeneration zone and supplied to the reaction zone. Movement of catalyst through the zones is often referred to as continuous though, in practice, it is semicontinuous, as described previously. For more details on continuous catalyst regeneration processes, see U.S. Pat. No. 3,652,231 (Greenwood et al.) shows regeneration apparatus in which a constant-width movable bed of catalyst is utilized. The '231 patent also describes a continuous catalyst regeneration process which is used in conjunction with catalytic reforming of hydrocarbons. U.S. Pat. No. 3,647,680 (Greenwood et al.) and U.S. Pat. No. 3,692,496 (Greenwood et al.) also deal with continuous regeneration of reforming catalyst. The '680 and '496 patents describe the reduction step of a continuous catalyst regeneration process, where the reduction step occurs in a reduction zone situated at the top of a multiple-stage reactor system. The teachings of patents 231, '680, and '496 are hereby incorporated in full into this patent application.

An essential feature of the present regeneration procedure is the presence of ozone in the gaseous mixture used for catalyst regeneration. During the coke burn step embodiment of this invention, it is believed that the use of ozone allows the coke on the catalyst to burn at relatively low temperature, while restoring the activity of the catalyst to essentially that of a fresh catalyst. Temperatures are maintained from about 20° C. up to about 250° C. (68 to 482° F.), for above 250° C. (482° F.) ozone converts to oxygen. This relatively low coke burning temperature is beneficial, primarily because it minimizes the degradation of some of the select physical and chemical properties of the catalyst, which can occur at higher temperatures and especially in the presence of water. In particular, this invention helps prevent loss of surface area of the catalyst, which in turn helps preserve the activity, selectivity, and stability of the catalyst. Where the catalyst contains a Group 8–10 metal component, this invention helps prevent the metal from migrating and agglomerating into large clusters during the carbon burn step. This also helps ensure that the performance of the catalyst remains close to that of fresh catalyst, since it has been established that once the Group 8–10 metal component on a nonacidic zeolite-containing catalyst such as zeolite L has clustered (or agglomerated), it is very difficult to recover the original performance level of the catalyst. This is in distinction to a nonzeolite-containing catalyst comprising a Group 8–10 metal where the metal has been found to be easily redispersed after agglomeration which occurs during a high-temperature carbon burn step. Thus, the prevention of the migration of the Group 8–10 metal component, when present on the zeolite L-containing catalyst, by using ozone the in the regeneration gases during the carbon burn is an important aspect of this invention.

In addition to containing ozone, the regeneration gases during the carbon burn step embodiment of this invention might also contain one or more halogen-containing compound(s). If present, such halogen-containing compound(s) are usually halogen oxide(s), since halogen-containing compounds that can be oxidized by ozone at the regeneration conditions will be oxidized to halogen oxides. Because such oxidation depletes the regeneration gases of ozone, it is preferred to forego adding to the regeneration gases a halogen-containing compound that can be oxidized by ozone at the regeneration conditions. Nevertheless, halogen oxides might be present in the regeneration gases because the regeneration gases may strip halogen-containing compounds from the catalyst. It is believed that such halogen oxides, if present, will not adversely affect the practice of this invention.

It is to be recognized that another important feature of the subject regeneration method is that the compositions of the regeneration gases used in the coke burn step, and of the gases used in the optional steps of the regeneration process, be carefully controlled. In addition to the requirement or preference that ozone or certain other components be present in the regeneration gas streams, there are also preferences that regeneration gases exclude other materials. In particular, it is an important feature of the present invention that the regeneration gas stream used during the coke burn step is substantially free of compounds of sulfur, particularly, oxides of sulfur and $H_2S$. Likewise, it may be preferable that the hydrogen stream used during the hereinafter-described optional reduction step be substantially free of both water and sulfur compounds such as $H_2S$. The gas stream used in the coke burn step embodiment of the present invention, and the regeneration gas streams used in the other optional steps of the regeneration process, are recycle streams, each of which is carefully controlled to ensure that the requirements or preferences given herein for its composition is satisfied. A slip stream of the circulating recycle gas may be vented from the process in order to prevent undesirable gaseous components or byproducts of regeneration (e.g., byproducts of coke combustion) from building up in the recycle gas. A makeup stream may be added to the circulating gases to introduce desired amounts of components, such as ozone and oxygen, into the recycle gas for regeneration. Other conventional techniques may be used to ensure the absence of detrimental components from any recycle stream. Furthermore, it is to be noted that the temperature given herein for the coke burn step, as well as for each of the optional steps of the regeneration, refer to the temperature of gas stream used therein just before it contacts the catalyst.

The coke burn step embodiment involves contacting the deactivated catalyst with a gaseous mixture comprising ozone. The ozone-containing gas has a concentration of ozone of generally from about 0.1 to about 5.0 mol-%, and preferably from about 0.5 to about 2.0 mol-%. The ozone is generally present with an inert gas. Typical inert gases useful in the carbon burn step include nitrogen, helium, carbon dioxide, and the like gases or mixtures thereof. A concentration of 5.0 mol-% is a somewhat arbitrary upper limit for ozone that has been established because 5.0 mol-% is the concentration of ozone above which it is deemed impractical to produce from an ozone generator or supply ozone in cylinders. Equipment and methods for generating ozone from air, as well as suppliers of cylinders of ozone, are known to person of ordinary skill in the art.

Oxygen may be also present in the regeneration gas used in the coke burn step embodiment. The oxygen may be present due to the addition of oxygen or air to the regeneration gas, or due to the conversion of ozone to oxygen. The oxygen concentration in the regeneration gas may be up to about 100 mol-% less the concentration of ozone. For example, if the ozone concentration is 2.0 mol-%, then the oxygen concentration may be up to 98.0 mol-% in the regeneration gas. But the oxygen concentration is generally less than about 21.0 mol-%. Since it is preferred that ozone, not oxygen, burns the coke on the catalyst, oxygen if present is preferably unreactive at the coke burn conditions. If the coke burn temperature is generally less than 250° C. (482° F.), then combustion of coke using oxygen is generally minimal.

If the oxygen that is present in the regeneration gas is due to the addition of air, then the maximum concentration of ozone in the regeneration gas is 2 mol-%. If the oxygen that is present in the regeneration gas is due to the addition of oxygen, then the maximum concentration of ozone in the regeneration gas is 5 mol-%.

The ozone concentration may be held constant during the coke burn step embodiment or varied throughout the coke burn step embodiment. It is preferable that the ozone level of the regeneration gas be slowly increased during the coke burn step such that at the end of the coke burn step, the regeneration gas contains up to about 5.0 mol-% ozone. The ozone level will be typically increased over a period of time based upon the increase in temperature of the regeneration gas as it passes across the catalyst bed. As the differential temperature across the catalyst bed drops, the ozone level may be increased to maintain a desired differential temperature. This results in a coke burn step that is quick and efficient. However, if desired, the ozone level of the regeneration may be kept at a constant low value of between 0.1 to 2.0 mol-% during the entire course of the regeneration to avoid thermal damage to the catalyst.

The coke burn embodiment of the regeneration method of this invention occurs at a temperature of from about 20° C. to about 250° C. (68 to 482° F.). Other regeneration conditions useful during the coke burn step include a partial pressure of ozone of generally up to about 101.3 kpa(g) (1 atmosphere(g)). The gas hourly space velocity (defined as the volume rate of the flow of the gas stream per hour at standard conditions divided by the volume of the bed of catalyst particles) is generally up to about 25,000 $hr^{-1}$, typically up to about 10,000 $hr^{-1}$ with a preferred range of from about 100 to about 8,000 $hr^{-1}$, and a more preferred range of from about 500 to about 5000 $hr^{-1}$. The total pressure is not critical, but the pressure is generally sufficient to maintain the flow of the first gaseous mixture through the zone containing the deactivated catalyst, such as a total pressure of from about 101.3 to about 3546 kPa (g) (1 to 35 atmosphere(g)), and more commonly from about 101.3 to about 709.1 kpa(g) (1 to 7 atmosphere(g)). The coke burn step is performed for a period of time sufficient to substantially remove coke from the catalyst. In general, depending obviously upon the amount of carbonaceous material present on the catalyst, the ozone level of the regeneration gas, and the temperature, a period of about 5 to about 30 or more hours is adequate in most cases. Ordinarily, when this step is terminated the coke content of the catalyst is preferably less than 0.5 wt-%, and more preferably less than 0.1 wt-%, based on the weight of the catalyst. Devices and methods for sampling the catalyst in a catalyst bed and analyzing the catalyst for coke content are known to persons of ordinary skill in the art.

It is often impractical or impossible to sample all of the catalyst in a catalyst bed during the coke burn step in order to analyze it for coke content. In those cases, other methods can be used—alone or in combination—to determine whether the coke burn step is completed. One method is to monitor the concentration of carbon dioxide in the catalyst bed's effluent gases (flue gases). As a general matter, with all other conditions being the same, as the carbon dioxide content declines, less coke burns in the catalyst bed. That in turn means that the coke content of the catalyst in the bed decreases, provided that that ozone flows uniformly through the catalyst bed.

Another method of determining when the coke burn step is complete is to monitor the temperatures of the catalyst bed. If the regeneration gases pass in a plug-flow manner through the catalyst bed, coke burning takes place along a "burn front" across the bed's cross-section transverse to the direction of flow of the regeneration gases. Initially, the "burn front" forms at the inlet end of the bed where the regeneration gases enter, but as coke burning progresses the "burn front" moves through the bed toward the outlet end where the flue gases exit. Bed thermocouples placed along the "burn front's" path indicate the localized rise in temperature from coke combustion and thus can be used to monitor the movement of the "burn front" through the bed. Once the "burn front" has reached the outlet end of the bed and the combustion of coke in the bed is substantially complete, the temperature rise associated with coke combustion diminishes and the operating conditions of the bed reach a steady state.

With respect to monitoring bed temperatures, it should be pointed out that, even in the absence of any coke burning, there may still be a temperature rise within or across the bed due to ozone conversion, since ozone is still entering the bed and since some ozone may convert to oxygen. Any temperature rise due to ozone conversion, however, generally occurs in relatively contained regions of the bed (usually near the gas inlet end) and generally will not move through the bed as the "burn front" did. Thus, even if the bed outlet temperature is greater than the bed inlet temperature and even if localized temperature measurements within the bed indicate a temperature rise, the coke burn step may nevertheless be complete.

A third method that can be used to determine if the coke burn step is complete is to monitor the ozone concentration in the catalyst bed's effluent gases (flue gases). Assuming that all other conditions in the catalyst bed are constant, as the concentration of ozone increases, less coke is burning in the catalyst bed. That in turn means that less coke is present in the bed, assuming that the flow of ozone through the catalyst bed is uniform. Thus, the presence of ozone in the flue gases (ozone "breakthrough") may be an indication that the coke burn step is complete.

It is preferred that a person of ordinary skill in the art uses a combination of these three methods to determine whether or not coke burning is occurring in the bed. For example, if a person of ordinary skill in the art monitored only the ozone concentration in the flue gas and observed that the ozone concentration is low or nil, that person might erroneously conclude that coke burning is proceeding in the catalyst bed. However, the absence of ozone in the flue gases does not necessarily indicate that coke burning is proceeding. Depending on the coke burning conditions, the catalyst, and the path length of the gases through the bed, ozone may be depleted by conversion to oxygen rather than by coke burning. As a result, the ozone concentration in the flue gas may be low or nil, but the catalyst bed may still contain coke, since little or no coke burning is occurring in the catalyst bed in areas where the ozone is depleted. However, if the person of ordinary skill in the art had also observed the movement of the "burn front" through the bed and had observed that "burn front" had not moved the entire length of the bed, that person could have correctly concluded that areas of coked catalyst remained in the bed and that little or no coke burning was taking place.

Another example of why a person of ordinary skill in the art should use ozone concentrations, carbon dioxide concentrations, and temperature measurements in combination to determine whether or not coke is burning in the bed is that the absence of carbon dioxide in the flue gas does not necessarily indicate that coke burning is complete. As mentioned previously, with all other conditions being the same, generally as the carbon dioxide content declines, the coke content of the catalyst in the bed decreases. However, in the case of ozone depletion by conversion to oxygen, the carbon dioxide concentration in the flue gas may be low or nil even though the catalyst bed still contains significant amounts of coke, since no carbon dioxide is being formed in the catalyst bed in areas where the ozone is depleted. Again, observing the movement of the "burn front" through the bed could indicate to a person of ordinary skill in the art that, even though little or no coke burning is taking place, areas of coked catalyst remain in the bed.

In the event that substantial amounts of coke remain in the bed and coke burning stops because ozone is being depleted by conversion to oxygen and not by coke burning, coke burning can be restarted by changing the point(s) of gas introduction to and/or gas withdrawal from the bed. For example, the direction of flow of the regeneration gases may be reversed, with the ozone-containing regeneration gases being introduced to the outlet end of the bed, and the flue gases being withdrawn from the inlet end of the bed. This may be particularly desirable in the case of relatively thick catalyst beds—that is, catalyst beds in which the path of the regeneration and flue gases through the bed is relatively long. In general, the longer the gas path, the greater is the likelihood that the ozone will have been depleted by conversion to oxygen prior to contacting all of the coked catalyst. But by introducing the ozone-containing regeneration gases into the bed at a different location so that the ozone directly contacts the coked catalyst without first passing through a long bed of catalyst, more complete combustion of coke can be achieved.

Once the "burn front" has moved through the length of the catalyst bed, and once the bed temperatures, ozone concentrations, and carbon dioxide concentrations have achieved steady state for a period of about 0.5 to about 5 hours, generally the coke burn step is completed. To confirm that the coke has been sufficiently removed from the catalyst in the bed, a sample of the catalyst can be taken from the catalyst bed and analyzed for coke content.

A second, optional step of the present regeneration method involves subjecting the catalyst resulting from the coke burn step to an oxyhalogenation step. This optional step involves contacting the catalyst with a gaseous mixture consisting essentially of about 0.1 to about 21.0 mol-% oxygen and from about 0.005 to 5.0 mol-% of a halogen or a halogen-containing compound and an inert gas such as nitrogen. Preferably, the oxygen concentration is from about 1 to about 3 mol-%. The total pressure during oxyhalogenation is generally from about 101.3 to about 1520 kpa(g) (1 to 15 atmosphere(g)). The temperature utilized in this step is preferably relatively higher compared to that used in coke burn step, and is selected from the range of about 400 to about 650° C. (752 to 1202° F.), and more commonly from about 350 to about 550° C. (662 to 1022° F.). Preferably, this optional step involves the use of a temperature of at least about 20° C. (36° F.) higher than the temperature used in the coke burn step. This higher temperature helps to combust any coke remaining on the catalyst that was not combusted in the coke burn step. In addition, the oxygen level of the regeneration gas may be increased to 21.0 mol-% oxygen or higher over the course of this step to remove any trace amounts of carbonaceous materials which were not burned off during the first step and to ensure that the metallic components of the catalyst are oxidized to a positive oxidation state. The presence of halogen-containing materials may help add halogen to the catalyst. Finally, the presence of a halogen such as molecular chlorine, molecular fluorine, or molecular bromine may help to redisperse the Group 8–10 metal component, if present, on the catalyst.

The resulting catalyst is thereafter typically purged with nitrogen or another inert gas to displace oxygen and water therefrom for a period of time which can be easily determined by monitoring the effluent gases from the zone containing the catalysts to determine when they are substantially free of oxygen and water.

After this purge step, another optional step is typically commenced. The reduction step involves contacting the catalyst from the carbon burn step with a hydrogen stream at a temperature of about 200 to about 500° C. (392 to 932° F.) for a final period of at least about 0.5 to about 5 hours. The purged catalyst from above is cooled and purged once again with hydrogen to begin the reduction step. The catalyst is purged before temperatures are raised in the reduction step. The preferred conditions for the reduction step are temperatures of about 300 to about 450° C. (572 to 842° F.) for a period of at least about 0.5 to 4 hours. Once again, the pressure and gaseous rates utilized for this step are preferably identical to those reported in conjunction with the discussion of the carbon burn step. The purpose of this reduction step is to reduce the metallic components essentially to an elemental state and to produce a regenerated catalyst having activity, selectivity, and stability characteristics comparable to those possessed initially by the fresh catalyst. It is contemplated that this reduction step may preferentially be conducted using a substantially water-free hydrogen gas stream. The hydrogen content of the hydrogen stream may be up to 100 mol-% hydrogen.

Although this reduction step may take place in a subzone within the regeneration zone, generally the catalyst is transported from the regeneration zone into to a subzone on top of the reaction zone or into a reactor from which catalyst had been withdrawn, where the catalyst is reduced. In the latter case, the reactor has generally been off-line and empty while its catalyst was being regenerated in the separate regeneration zone. Once the reactor is re-filled with the oxidized catalyst following the optional second step, the reactor is purged with an inert gas such as nitrogen to remove oxygen and then a hydrogen-containing gas is passed through the reactor at the conditions described above. Following this reduction step, the hydrocarbon conversion process in which the catalyst is utilized may be restarted by once again charging the hydrocarbon stream and any other co-feed to the zone containing the catalyst at conditions designed to produce the desired product. In the preferred case, this involves re-establishing reforming conditions within the zone containing the catalyst.

The FIGURE shows an embodiment of the invention where a stacked arrangement 10 of three reforming reactors 11, 12, and 13, is oriented vertically below a regenerator 36, which in turn is located vertically below a disengager 28. This orientation of disengager 28, regenerator 36, and stacked reactor arrangement 10 allows catalyst particles to flow downward by gravity flow between and through this equipment. In particular, within the stacked reactor arrangement 10, catalyst particles flow by gravity from reactor 11 to reactor 12, and from reactor 12 to reactor 13. Each reactor is vertically elongated and contains a vertically elongated catalyst bed.

Although not shown in the FIGURE, the hydrocarbon flow through the stacked reactor arrangement is as follows. Hydrocarbon feedstock usually in a mixture with hydrogen and at an elevated temperature flows first to reactor 11, where reforming reactions occur in the presence of the catalyst. An effluent is withdrawn from reactor 11, heated to the desired inlet temperature of reactor 12, and flows into reactor 12, where additional reforming reactions occur. An effluent is withdrawn from reactor 12, heated to the desired inlet temperature of reactor 13, and is passed into reactor 13, where further reforming reactions take place. Reactor 13's effluent flows to conventional recovery facilities (not shown) for recovery of the reformed hydrocarbons. As a result of these reactions, the catalyst in each reactor 11, 12, and 13 accumulates at least some coke deposits. But, in this sort of flow scheme, the quantity of accumulated coke deposits on the catalyst in reactor 13 is greater than that in reactor 12, which in turn is greater than that in reactor 11. Also, the volume of catalyst in reactor 13 is generally greater than that in reactor 12, which in turn is greater than that in reactor 11. Within each reactor's catalyst bed the hydrocarbons may pass in a radial direction or in an axial direction. For more details on suitable stacked reactor arrangements, see U.S. Pat. Nos. 3,647,680; 3,692,496; 3,706,536; 3,882,015; 3,978,150; 4,110,081; and 4,567,023.

Catalyst particles are regenerated in the regenerator 36 in a fixed bed. Catalyst particles in the stacked reactor arrangement catalyze reactions in one or more fixed beds, except when catalyst particles are being added to or withdrawn from the stacked reactor arrangement 10. The stacked reactor arrangement 10 continues to convert hydrocarbons during the periods when coked catalyst particles are removed and regenerated catalyst particles are returned. The transfer of catalyst particles from the stacked reactor arrangement 10 via the disengager 28 to the regenerator 36, and from the regenerator 36 to the stacked reactor arrangement 10, is batchwise. The size of the batches depends on several factors, but the primary factor is the catalyst holding capacity of the regenerator 36, and also that of the other equipment between the stacked reactor arrangement and the regenerator 36, such as disengager 28 and seal drum and lock hopper arrangement 40. The frequency of the batches depends on many factors as well, though mainly on the deactivation rate of the catalyst in the stacked reactor arrangement 10. Generally, the volume of each catalyst batch that is withdrawn from the stacked reactor arrangement is usually from about 0.01 to about 10% of the volume of catalyst in the stacked reactor arrangement 10, and the frequency is from about one batch every 4 hours to about one batch every month.

When catalyst particles in the bottom of stacked reactor arrangement 10 become deactivated, catalyst particles containing coke deposits are withdrawn from a collector 15. A hydrogen-containing gas flowing through line 14 into collector 15 helps displace or purge hydrocarbon from the stream of withdrawn coked catalyst. Catalyst flows from the bottom of the collector 15 into line 16, which displaces hydrogen and hydrocarbons from the stream of coked catalyst particles to prevent any carry-over of hydrogen and hydrocarbon to the disengager 28 or the regenerator 36. At the bottom of line 16, a regulating fluid preferably comprising nitrogen enters nonmechanical valve 24 through line 18 at a rate that regulates the transfer of coked catalyst particles through the valve 24 into lift line 26. Nonmechanical valve 24 can take on forms such as L valves, J valves, and K valves. Nonmechanical valves are well known, and further information on the operation of such valves can be found in an article titled, "L Valves Characterized for Solid Flow," Hydrocarbon Processing, March 1978, page 149, in a text titled "Gas Fluidization Technology," edited by D. Geldart, John Wiley & Sons, 1986, and in U.S. Pat. No. 4,202,673.

As coked catalyst particles enter lift line 26, lift fluid which preferably comprises nitrogen enters the bottom of the lift line through line 22 and transports the catalyst particles upwardly through lift line 26 to the top of the disengager 28. Disengager 28 separates chipped or broken catalyst particles or catalyst fines from the entering catalyst particles. The catalyst pieces or fines flow through line 30 and are recovered in dust collector 32. Disengagers are well known in the art. Disengager 28 maintains a volume of catalyst to balance transitory differences in the flow that may occur during intermittent transport of catalyst through the stacked reactor arrangement 10 and the regenerator 36. Catalyst particles then flow through line 34 to regenerator 36, gradually filling regenerator 36 with coked catalyst particles. Prior to the entry of any coked catalyst particles, the regenerator 36 is typically empty of catalyst. Once a sufficient quantity of catalyst particles has been added to form a fixed bed of the desired size, the catalyst particles are regenerated according to the method of this invention.

After removal of coke and optionally oxidizing the catalyst particles in the regeneration vessel 36, a line 38 transfers catalyst particles to a nitrogen seal drum and lock hopper arrangement 40. A line 42 transfers catalyst by gravity flow from the nitrogen seal drum and lock hopper arrangement 40. The nitrogen seal drum and lock hopper arrangement 40 control the transfer of catalyst back to the stacked reactor arrangement 10. The nitrogen seal drum and lock hopper arrangement 40 also displace oxygen gas from the flowing stream of oxidized catalyst particles to prevent any carry-over of oxygen to the reactor side of the process. Seal drum and lock hopper arrangements are well known to persons of ordinary skill in the art and may be used in any of their current well-known forms to supply a flow of oxidized catalyst into line 42. The nitrogen seal drum and lock hopper arrangement 40 may maintain a volume of catalyst to balance transitory differences in the flow that may occur during intermittent transport of catalyst through the stacked reactor arrangement 10 and the regenerator 36. Oxidized catalyst particles flow through line 42 to the top of stacked reactor arrangement 10, where a reduction zone (not shown) is located above reactor 11 for reducing the catalyst particles. Reduced catalyst particles flow by gravity flow from the reduction zone into reactor 11.

While the FIGURE shows a stacked arrangement of three vertically elongated reactors, a side-by-side arrangement of the reactors is also within the scope of this invention. In a side-by-side arrangement of three vertically elongated reactors, each reactor would be provided with a collector like collector 15, a nonmechanical valve like nonmechanical valve 24, and a lift line such as lift line 26. The collector, nonmechanical valve, and lift line beneath the first reactor would be used to lift catalyst particles to the top of the second reactor. Similarly, the collector, nonmechanical valve, and lift line beneath the second reactor would be used to lift catalyst particles to the top of the third reactor. Finally, the collector, nonmechanical valve, and lift line beneath the third reactor would be used to lift catalyst particles to the disengager. The first reactor would be oriented vertically below the regenerator, which in turn would be located vertically below the disengager, thereby permitting gravity flow of catalyst particles from the disengager, through the regeneration, and into the first reactor. In this side-by-side arrangement, gas streams containing molecular hydrogen would be used as the regulating and lift gases for pneumatically conveying the catalyst particles between the first and second reactors and between the second and third reactors, while a gas stream containing molecular nitrogen would be used as the regulating and lift gases for pneumatically conveying the catalyst particles from the third reactor to the disengager.

Also within the scope of this invention is an arrangement in which one or more of the reactors is oriented vertically above the regenerator. This arrangement would allow catalyst particles to flow by gravity from the last reactor to the disengager, from the disengager by gravity flow to the regenerator, and by gravity flow from the regenerator to the seal drum and lock hopper arrangement. In this arrangement, the seal drum and lock hopper arrangement would be provided with a nonmechanical valve like nonmechanical valve 24 and a lift line such as lift line 26. The nonmechanical valve and lift line beneath the seal drum and lock hopper arrangement would be used to lift catalyst particles to the top of the first reactor. A gas stream containing molecular hydrogen would be used as the regulating and lift gases for pneumatically conveying the catalyst particles between the seal drum and lock hopper arrangement and the first reactor.

All references herein to groups of elements are to the Periodic Table of the Elements, "CRC Handbook of Chemistry and Physics," CRC Press, $80^{th}$ Edition, 1999–2000.

The following examples are given to illustrate further the regeneration method of the present invention and to indicate the benefits that are realized through the utilization thereof. It is understood that the examples are given for the sole purpose of illustration and not to limit the scope of the invention as set forth in the claims.

A fresh catalyst was prepared containing zeolite L and 1.2 wt-% platinum based on the weight of the catalyst. Samples of the fresh catalyst were tested in Comparative Example 1 and Example 1. The fresh catalyst was loaded in a commercial reforming reactor and used to reform paraffins into aromatics. After some days on stream, a portion of the catalyst was removed from the commercial reactor. The catalyst that was removed had coke deposits and contained 0.2 wt-% carbon based on the weight of the coked catalyst. Samples of this coked catalyst were used in Comparative Example 2 and Example 2. After some more days on stream, another portion of the catalyst was removed from the commercial reactor. The catalyst in this second portion also had coke deposits and contained 2 wt-% carbon based on the weight of the coked catalyst. Samples of this catalyst were used in Comparative Examples 3 and 4 and Example 3.

The treatment conditions used in Comparative Example 4 and Examples 1, 2, and 3 comprised contacting a 30 cc catalyst sample at a flow rate of gas of 2000 cc/hr at atmospheric pressure for 3 hours.

The test conditions used in all of the examples comprised contacting the catalyst in a microreactor with n-heptane at a weight hourly space velocity of $3.7 \ hr^{-1}$ a molar ratio of hydrogen to hydrocarbon of 70:1, and a temperature of 425° C.

COMPARATIVE EXAMPLE 1

A sample of the fresh catalyst was tested at the test conditions in the microreactor. The n-heptane conversion was 42%.

EXAMPLE 1

A sample of the fresh catalyst was treated at the treatment conditions, which additionally comprised contacting the sample with a gas mixture that was formed by mixing air and ozone and which had an ozone concentration of 2 vol-% at a temperature of 100° C. A sample of the treated catalyst was tested at the test conditions in the microreactor. The n-heptane conversion was 44%.

Comparative Example 1 and Example 1 show that the treatment conditions in Example 1 had only a relatively small effect—only 2 percentage points—on the n-heptane conversion.

COMPARATIVE EXAMPLE 2

A sample of the 0.2 wt-% carbon catalyst was tested at the test conditions in the microreactor. The n-heptane conversion was 16%.

EXAMPLE 2

A sample of the 0.2 wt-% carbon catalyst was treated at the same treatment conditions as in Example 1. A sample of the treated catalyst, which had a carbon content of less than 0.1 wt-% based on the weight of the treated catalyst, was tested at the test conditions in the microreactor. The n-heptane conversion was 24%.

While Comparative Example 2 shows that the 0.2 wt-% carbon catalyst has become somewhat deactivated, Example 2 shows that ozone regeneration increases the n-heptane conversion by 6 percentage points.

COMPARATIVE EXAMPLE 3

A sample of the 2 wt-% carbon catalyst was tested at the test conditions in the microreactor. The n-heptane conversion was 3.7%.

Comparative Example 3 shows the 2 wt-% carbon catalyst has become even more deactivated than the 0.2 wt-% carbon catalyst in Comparative Example 2.

COMPARATIVE EXAMPLE 4

A sample of the 2 wt-% carbon catalyst was treated at the treatment conditions, which additionally comprised contacting the sample with air at a temperature of 500° C. The treated catalyst had a carbon content of less than 0.1 wt-% based on the weight of the treated catalyst. The treated catalyst was tested at the test conditions in the microreactor. The n-heptane conversion was 7.2%.

Comparative Examples 3 and 4 show that air regeneration in the absence of ozone of the 2 wt-% carbon catalyst increases the n-heptane conversion by only 3.5 percentage points.

EXAMPLE 3

A sample of the 2 wt-% carbon catalyst was treated at the same treatment conditions as in Example 1. A sample of the treated catalyst, which had a carbon content of less than 0.1 wt-% based on the weight of the treated catalyst, was tested at the test conditions in the microreactor. The n-heptane conversion was 25.6%.

Comparative Examples 3 and 4 and Example 3 show that ozone regeneration of the 2 wt-% carbon catalyst increases the n-heptane conversion by 21.9 percentage points, and by 18.4 percentage points over air regeneration.

We claim:

1. A process for regenerating a hydrocarbon conversion catalyst comprising zeolite L, the process comprising contacting the catalyst with a gaseous stream comprising ozone at regeneration conditions and absent a halogen-containing compound oxidizable by ozone at the regeneration conditions, the contacting occurring at a temperature of from about 20 to about 250° C.

2. The process of claim 1 further characterized in that the catalyst has coke deposited thereon, and the process comprises removing at least a portion of the coke from the catalyst.

3. The process of claim 1 further characterized in that the contacting occurs at a partial pressure of ozone of up to about 101.3 kPa(g).

4. The process of claim 1 further characterized in that the contacting of the catalyst with ozone comprises contacting the catalyst with an ozone-containing gas having a concentration of ozone of from about 0.1 to about 5 mol-%.

5. The process of claim 1 further characterized in that the zeolite L contains a metal selected from the group consisting of metals in IUPAC Group 6 (VI A), IUPAC Group 7 (VII A), IUPAC Group 8–10 (VIII A), and IUPAC Group 14 (IV B) of the Periodic Table of the Elements.

6. A process for at least partially reactivating a coked zeolite L-containing reforming catalyst, the process comprising contacting the catalyst with a gaseous stream comprising ozone and at least one of air and oxygen and containing from about 0.1 to about 5.0 mol-% ozone, at conditions comprising a temperature of from about 20 to about 250° C. and a gas hourly space velocity of up to about 10,000 hr$^{-1}$, and absent a halogen-containing compound oxidizable by ozone at the regeneration conditions, the conditions being sufficient to burn at least a portion of the coke on the catalyst.

* * * * *